United States Patent
Panikkar

(10) Patent No.: US 12,541,401 B2
(45) Date of Patent: Feb. 3, 2026

(54) INTELLIGENT AUTO-SCALING OF CONTAINERIZED WORKLOADS IN CONTAINER COMPUTING ENVIRONMENT

(71) Applicant: Dell Products L.P., Round Rock, TX (US)

(72) Inventor: Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 797 days.

(21) Appl. No.: 17/579,702

(22) Filed: Jan. 20, 2022

(65) Prior Publication Data

US 2023/0229511 A1    Jul. 20, 2023

(51) Int. Cl.
G06F 9/44 (2018.01)
G06F 9/50 (2006.01)
G06F 11/07 (2006.01)

(52) U.S. Cl.
CPC ............ G06F 9/5038 (2013.01); G06F 9/505 (2013.01); G06F 11/073 (2013.01); G06F 2209/505 (2013.01)

(58) Field of Classification Search
CPC ...... G06F 9/5038; G06F 9/505; G06F 11/073; G06F 2209/505; G06F 9/5011; G06F 11/3409; G06F 11/3433; G06F 11/3466; G06F 11/302; G06F 2209/5019

See application file for complete search history.

(56) References Cited

U.S. PATENT DOCUMENTS

| | | | |
|---|---|---|---|
| 10,433,014 B2* | 10/2019 | Wolff | H04N 21/4334 |
| 10,922,118 B2* | 2/2021 | Luo | G06F 8/63 |
| 11,294,733 B2* | 4/2022 | Chester | G06F 9/5083 |
| 2012/0185596 A1* | 7/2012 | Bellessort | G06F 16/9574 709/225 |
| 2017/0019870 A1* | 1/2017 | Srivastava | H04W 56/001 |
| 2018/0074748 A1* | 3/2018 | Makin | G06F 9/4856 |
| 2019/0286486 A1* | 9/2019 | Ma | G06F 9/5027 |
| 2020/0366758 A1* | 11/2020 | Chauhan | H04L 67/51 |
| 2022/0253347 A1* | 8/2022 | Jones | G06F 9/5055 |
| 2023/0063893 A1* | 3/2023 | Apfelbaum | G06F 9/5027 |

OTHER PUBLICATIONS

Anqi Zhao et al 2019 IOP Conf. Ser.: Mater. Sci. Eng. 569 052092 (Year: 2019).*
K. Casey, "5 Approaches to Cloud Automation," https://enterprisersproject.com/article/2021/2/cloud, Feb. 5, 2021, 6 pages.

(Continued)

*Primary Examiner* — Hang Pan
(74) *Attorney, Agent, or Firm* — Ryan, Mason & Lewis, LLP

(57) ABSTRACT

Techniques for managing containerized workloads in a container computing environment are disclosed. For example, a method comprises the following steps. The method predicts a composite time delay value for initializing an instance of a containerized workload for executing a microservice within a container computing environment. The method then computes at least one target resource utilization parameter, based on the predicted composite time delay value, for use by the container computing environment.

20 Claims, 12 Drawing Sheets

(56) References Cited

OTHER PUBLICATIONS

Kubernetes, "Horizontal Pod Autoscaler," https://kubernetes.io/docs/tasks/run-application/horizontal-pod- autoscale/, Jul. 26, 2021, 9 pages.
Github, "Vertical Pod Autoscaler," https://github.com/kubernetes/autoscaler/tree/master/vertical-pod-autoscaler, Accessed Aug. 19, 2021, 9 pages.
Github, "kubernetes/autoscaler," https://github.com/kubernetes/autoscaler, Accessed Aug. 19, 2021, 3 pages.
U.S. Appl. No. 17/503,469 filed in the name of Shibi Panikkar on Oct. 18, 2021, and entitled "Containerized Workload Management in Container Computing Environment."

* cited by examiner

FIG. 11

| SERVICE 1 – SIZE 48 KB | | | 12 AM TO 1 | 1 TO 2 | 2 TO 3 | 4 TO 5 | 5 TO 6 | 6 TO 7 | 7 TO 8 | 8 TO 9 | 9 TO 10 | 11 TO 12 PM |
|---|---|---|---|---|---|---|---|---|---|---|---|---|
| MONDAY | | TIME TAKEN | NO POD CREATION | NO POD CREATION | 56 ms | 98 ms | 109 ms | 112 ms | 109 ms | 117 ms | 107 ms | 103 ms |
| | | MEMORY | 47% | 42% | 82% | 84% | 87% | 89% | 85% | 90% | 86% | 82% |
| | | CPU | 48% | 44% | 81% | 82% | 83% | 88% | 84% | 92% | 86% | 81% |
| | | | 12 PM TO 1 | 1 TO 2 | 2 TO 3 | 4 TO 5 | 5 TO 6 | 6 TO 7 | 7 TO 8 | 8 TO 9 | 9 TO 10 | 11 TO 12 AM |
| | | | 98 ms | 89 ms | 102 ms | 112 ms | 109 ms | 189 ms | 178 ms | 153 ms | 79 ms | NO POD CREATION |
| | | MEMORY | 47% | 42% | 82% | 84% | 87% | 89% | 85% | 90% | 86% | 63% |
| | | CPU | 81% | 80% | 84% | 87% | 90% | 94% | 92% | 90% | 80% | 52% |

INTELLIGENT AUTO-SCALING OF CONTAINERIZED WORKLOADS IN CONTAINER COMPUTING ENVIRONMENT

FIELD

The field relates generally to information processing systems, and more particularly to containerized workload management in such information processing systems.

BACKGROUND

Information processing systems increasingly utilize reconfigurable virtual resources to meet changing user needs in an efficient, flexible and cost-effective manner. For example, cloud-based computing and storage systems implemented using virtual resources in the form of containers have been widely adopted. Such containers may be used to provide at least a portion of the virtualization infrastructure of a given information processing system. However, significant challenges arise in managing container environments.

SUMMARY

Illustrative embodiments provide techniques for managing containerized workloads in a container computing environment.

For example, in an illustrative embodiment, a method comprises the following steps. The method predicts a composite time delay value for initializing an instance of a containerized workload for executing a microservice within a container computing environment. The method then computes at least one target resource utilization parameter, based on the predicted composite time delay value, for use by the container computing environment.

In further illustrative embodiments, the method may re-predict the composite time delay value at a subsequent time interval, and adjust the at least one target resource utilization parameter based on the re-predicted composite time delay value.

While such container management techniques are particularly effective in pod-based container environments, it is to be appreciated that the techniques can be implemented in other container environments.

These and other illustrative embodiments include, without limitation, apparatus, systems, methods and computer program products comprising processor-readable storage media.

BRIEF DESCRIPTION OF THE DRAWINGS

FIG. 11 illustrates data collection for an image download time utilized by a prediction model according to an illustrative embodiment.

DETAILED DESCRIPTION

Figure 1:
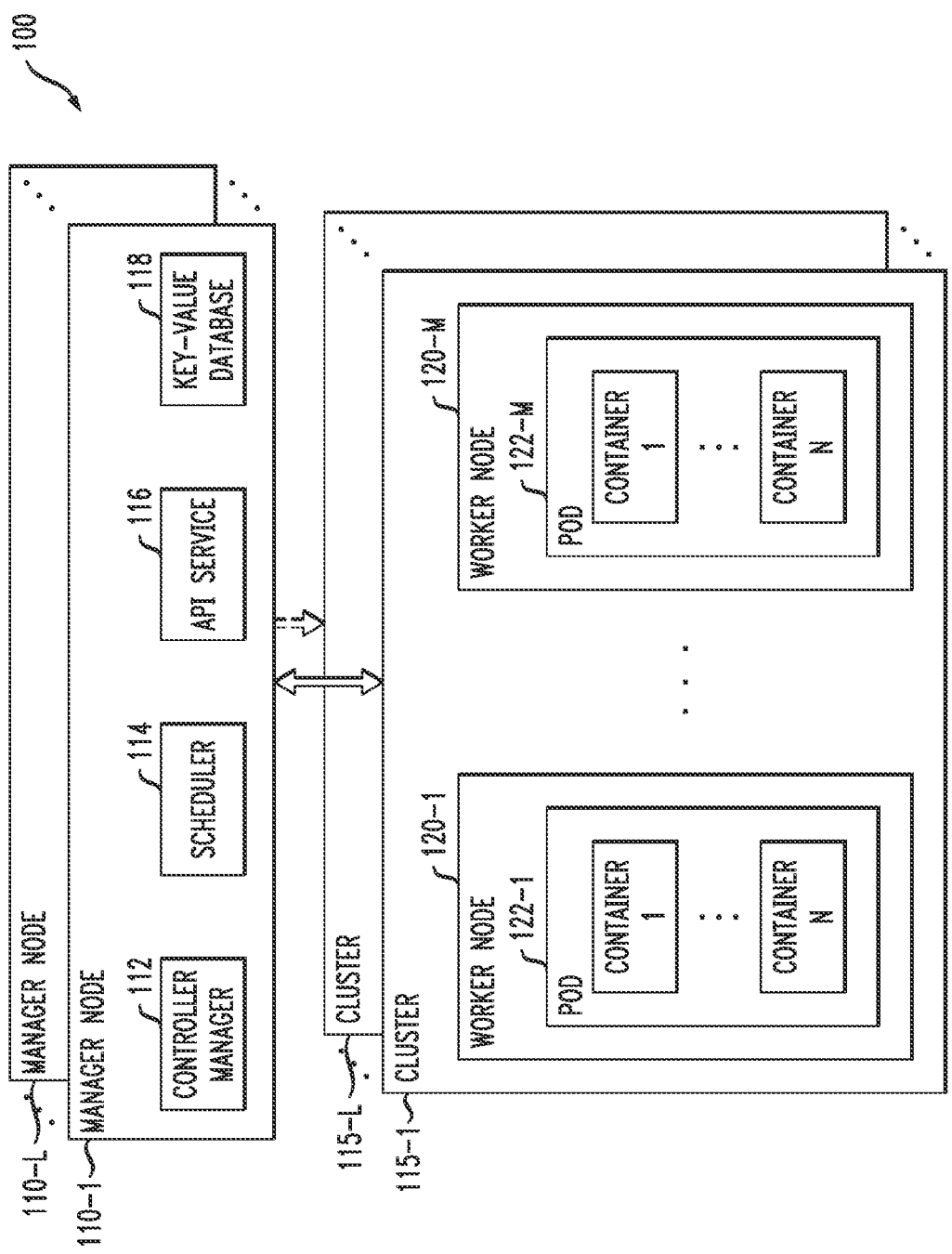
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy their application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of manager nodes 110-1, . . . 110-L (herein each individually referred to as manager node 110 or collectively as manager nodes 110) are respectively operatively coupled to a plurality of clusters 115-1, . . . 115-L (herein each individually referred to as cluster 115 or collectively as clusters 115). As mentioned above, each cluster is managed by at least one manager node. Illustrative embodiments provide for application copy management across multiple clusters (e.g., from one cluster of clusters 115 to another cluster of clusters 115), as will be further explained in detail herein.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of containers 1, . . . N (each pod may also have a different number of containers). As used herein, a pod may be referred to more generally as a containerized workload. Also shown in FIG. 1, each manager node 110 comprises a controller manager 112, a scheduler 114, an application programming interface (API) service 116, and a key-value database 118, as will be further explained. However, in some embodiments, multiple manager nodes 110 may share one or more of the same controller manager 112, scheduler 114, API service 116, and key-value database 118.

Worker nodes 120 of each cluster 115 execute one or more applications associated with pods 122 (containerized workloads). Each manager node 110 manages the worker nodes 120, and therefore pods 122 and containers, in its corresponding cluster 115. More particularly, each manager node 110 controls operations in its corresponding cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
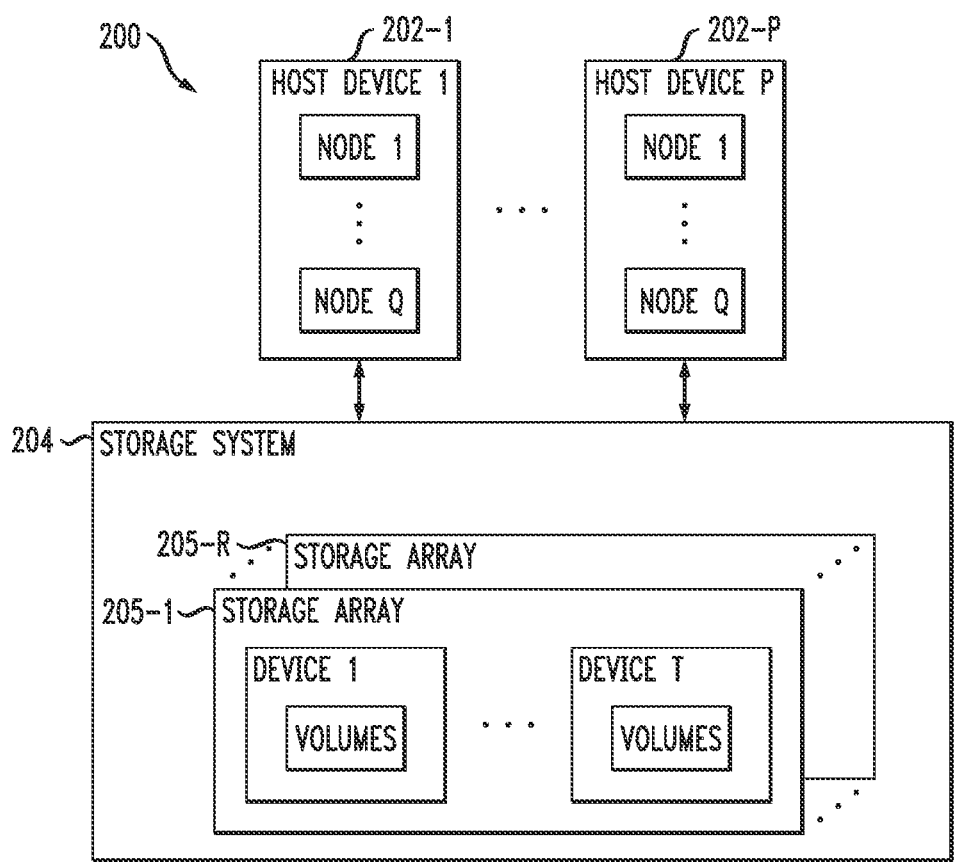
FIG. 2 illustrates host devices and a storage system within which one or more illustrative embodiments can be implemented.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . Q. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . Q on a given host device 202 can be a manager node 110 or a worker node 120 (FIG. 1). In some embodiments, a node can be configured as a manager node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . Q is stored as persistent storage volumes in one or more of the storage devices 1, . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with additional figures.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds).

As mentioned above, a Kubernetes pod may be referred to more generally herein as a containerized workload. One example of a containerized workload is an application program configured to provide a microservice. A microservice architecture is a software approach wherein a single application is composed of a plurality of loosely-coupled and independently-deployable smaller components or services. Container-based microservice architectures have profoundly changed the way development and operations teams test and deploy modern software. Containers help companies modernize by making it easier to scale and deploy applications. By way of example, Kubernetes helps developers and microservice operations teams because it manages the container orchestration well. However, Kubernetes is more than a container orchestrator, as it can be considered an operating system for cloud-native applications in the sense that it is the platform that applications run on, (e.g., just as desktop applications run on MacOS, Windows, or Linux). Tanzu from VMWare is a suite of products that helps users run and manage multiple Kubernetes (K8S) clusters across public and private cloud platforms.

Thus, it is realized that microservices provide an ideal architecture for continuous delivery. For example, in an illustrative microservice architecture, each application may reside in a separate container along with the environment it needs to run. Because of this, each application can be edited in its container without the risk of interfering with any other application. However, while there are countless benefits of microservices, the microservice architecture introduces new challenges to developers. One of the main challenges microservices introduces is managing a significant number of microservices for an application.

Several enterprise vendor platforms and Software-as-a-Service (SaaS) frameworks have been introduced to manage microservices such as, but not limited to, Kubernetes, Docker, Pivotal Cloud Foundry (PCF), Azure Kubernetes Service (AKS), Pivotal Container Service (PKS), etc. Along with other microservice management features, these frameworks and platforms attempt to address the scalability of microservices. For a given microservice-based application, as the request load increases or decreases, the container needs to increase or decrease the instances of microservices. In current microservice container environments, automatic scaling or "auto-scaling" is used to attempt to ensure that an application has a sufficient amount of targeted resource capacity allocated to handle the traffic demand. However, current auto-scaling solutions do not address important scaling issues.

Auto-scaling is an important concept in cloud automation. Without auto-scaling, resources (e.g., compute, storage, network, etc.) have to be manually provisioned (and later scaled down) every time conditions change. As such, it will be less likely that the container computing environment will operate with optimal resource utilization and cloud spending.

In the Kubernetes framework, there are actually three auto-scaling features: horizontal pod auto-scaler (HPA), vertical pod auto-scaler (VPA), and cluster auto-scaler (CA). HPA is based on a scale-out concept manually allowing administrators to increase or decrease the number of running pods in a cluster as application usage (e.g., requests) changes. VPA is based on a scale-up concept by adding more central processing unit (CPU) or memory capacity to a cluster. CA is based on a concept of adding or removing clusters in case a cluster itself is overloaded. HPA is typically considered a best practice, i.e., to ensure enough resources are allocated for sufficient operation of a microservice within a cluster. Further, in Kubernetes, an administrator can manually specify a fixed targeted utilization parameter with respect to resources to start replication of a microservice instance.

Figure 3:
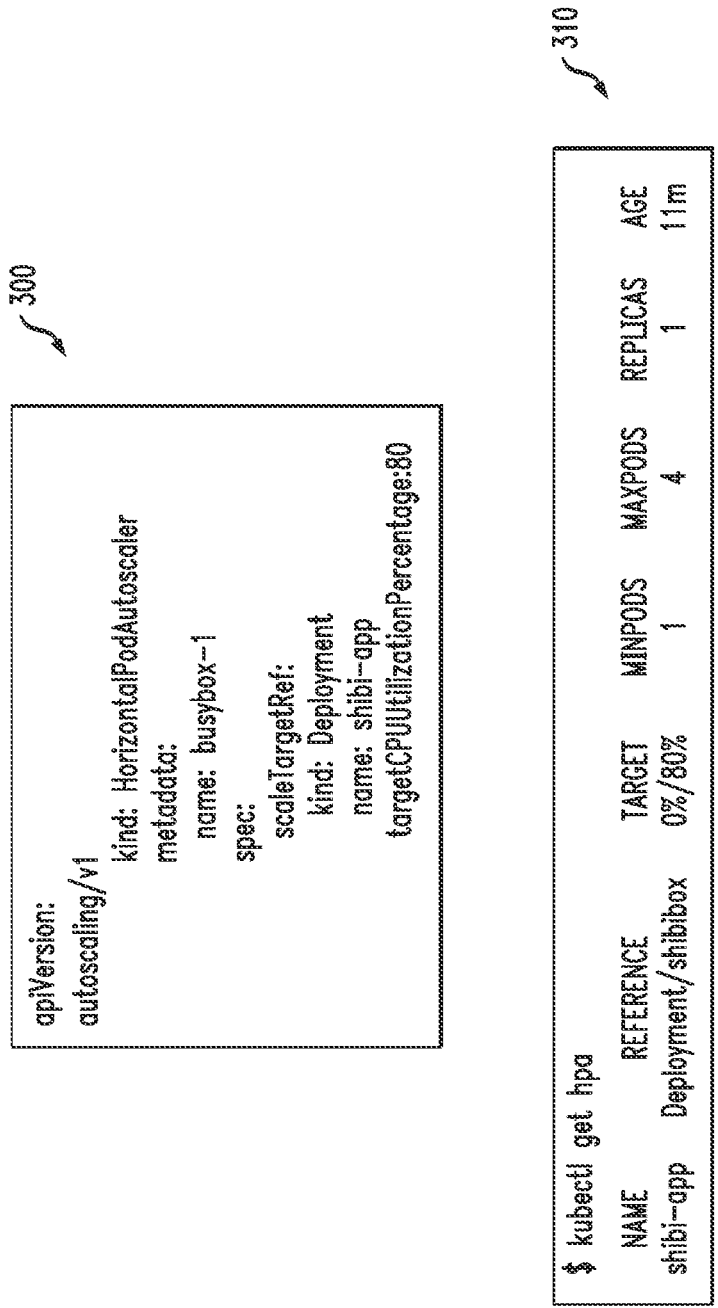
FIG. 3 illustrates an exemplary microservice application deployment with which one or more illustrative embodiments can be implemented.

For example, consider settings 300 in FIG. 3 for HPA with respect to CPU utilization. HPA based on CPU utilization is used as an example in illustrative embodiments. However, container workload management techniques described herein are equally applicable to any metric that can be auto-scaled (e.g., memory capacity, network capacity, etc.).

Further assume a Kubernetes deployment is created for a microservice called "shibi-app" with targetCPUUtilization as 80% depicted as 310 in FIG. 3. This means that the Kubernetes platform (e.g., manager node 110 in FIG. 1 or some other component) will start spinning (instantiating, creating, etc.) one or more new pods when the first pod reaches 80% CPU (targetCPUUtilization), i.e., 80% of the CPU capacity is being utilized. The number of pods that are created is calculated with the formula:

desiredReplicas=ceil[currentReplicas*(currentMetricValue/desiredMetricValue)]

When there are multiple pods, the 80% applies to all pods, meaning that when all pods exceed 80%, the Kubernetes platform will start spinning new pods.

Figure 4:
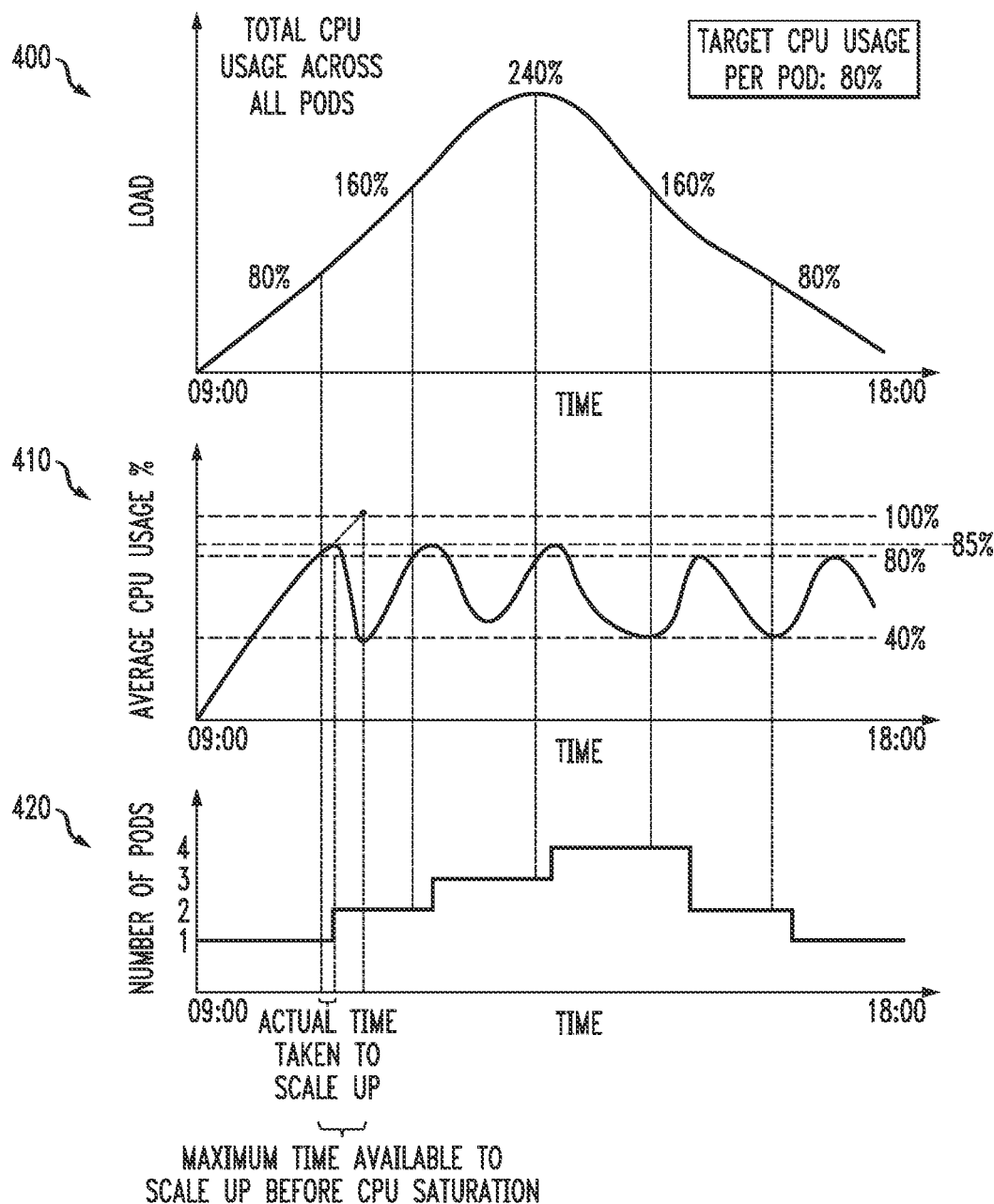
FIG. 4 illustrates a set of metrics associated with execution of a microservice application with which one or more illustrative embodiments can be implemented.

Now consider the steady increase/decrease in the load on this microservice. As shown in FIG. 4, three metrics are represented for a time period of 9 am to 6 pm: load versus time (400 in FIG. 4); average CPU usage percentage versus time (410 in FIG. 4); and number of pods versus time (420 in FIG. 4).

Initially, as graphically represented in FIG. 4, the Kubernetes framework starts with a single pod. When CPU load reaches 80%, the framework spins a new pod. By the time the new pod initializes, the CPU utilization became 85%. Soon after that the CPU usage goes down. However, after a point of time, it starts to increase as average CPU usage increases. When the CPU usage reaches 160%, the average CPU usage reaches 80% (160/2) in each pod. So, the framework starts spinning another pod. Again, assume CPU usage per pod falls. The same cycle repeats until the framework reaches the maximum available CPU capacity. Once the total load decreases, the reverse happens. The framework starts releasing (terminating, etc.) pods at a total CPU usage of 160% and 80%.

One main issue is that if the time to scale up (spinning a new pod) is greater than the time for the pod to reach 80% to 100% resource consumption, the pod goes beyond 100% utilization before the new instance (pod) establishes and shares the load. This situation leads to, for example, an out of memory error (e.g., 5xx error in Kubernetes framework).

It is realized herein that the time to scale a new pod depends on factors comprising service cluster, environment, and size of the microservice deployment image.

It is therefore realized that the above factors vary with each microservice and deployed environment. Thus, as is currently done, maintaining static targetCPUUtilization and targetMemoryUtilization parameters based on a rough estimate (so-called "guestimate") may not be accurate all the time and may lead to errors. Currently, there are several issues caused by this fixed parameter approach in a production environment. Note that a production environment is considered when the microservice is made available in real time or online to users, as opposed to offline (sometimes called a test environment). The current remedy is to then reduce the targetCPUUtilization parameter, but again this is only a guestimate by the administrator of some lower value.

Figure 5:
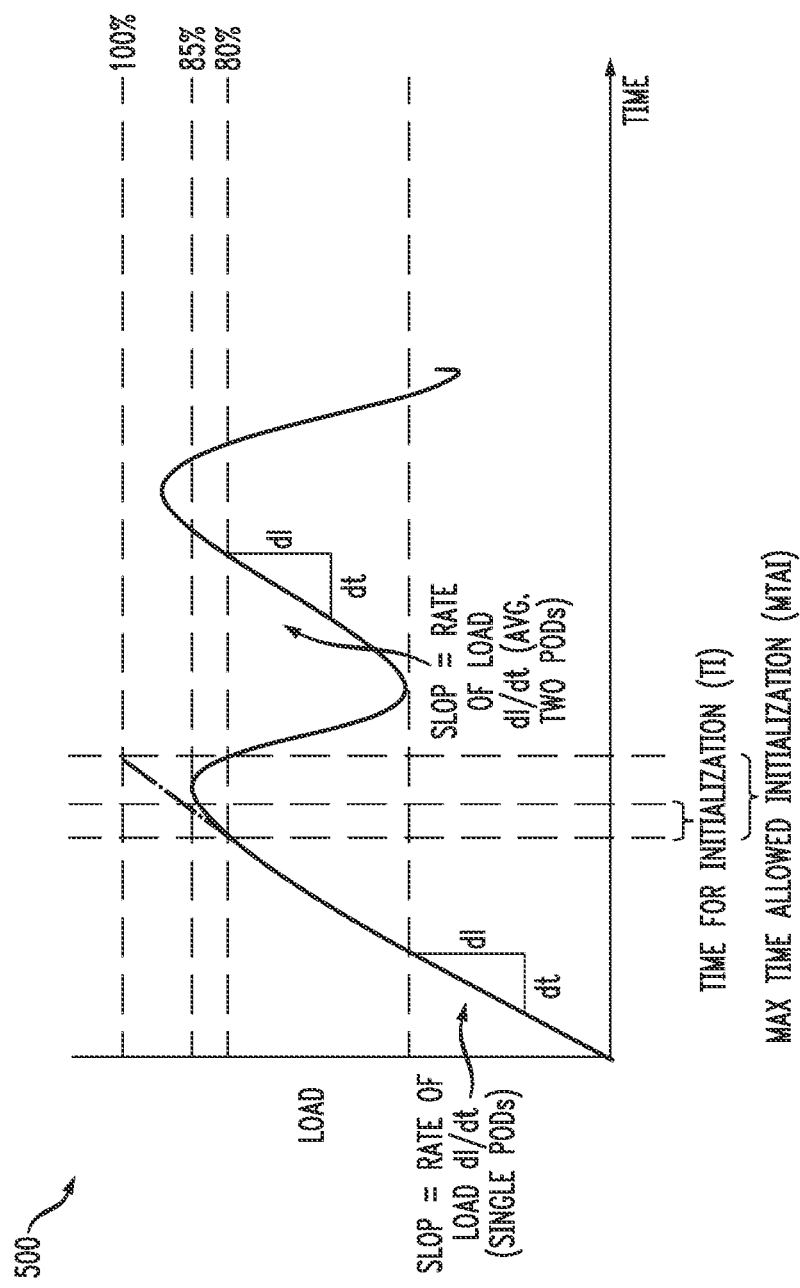
FIGS. 5 and 6 respectively illustrate a change in load associated with execution of a microservice application with which one or more illustrative embodiments can be implemented.
Figure 6:
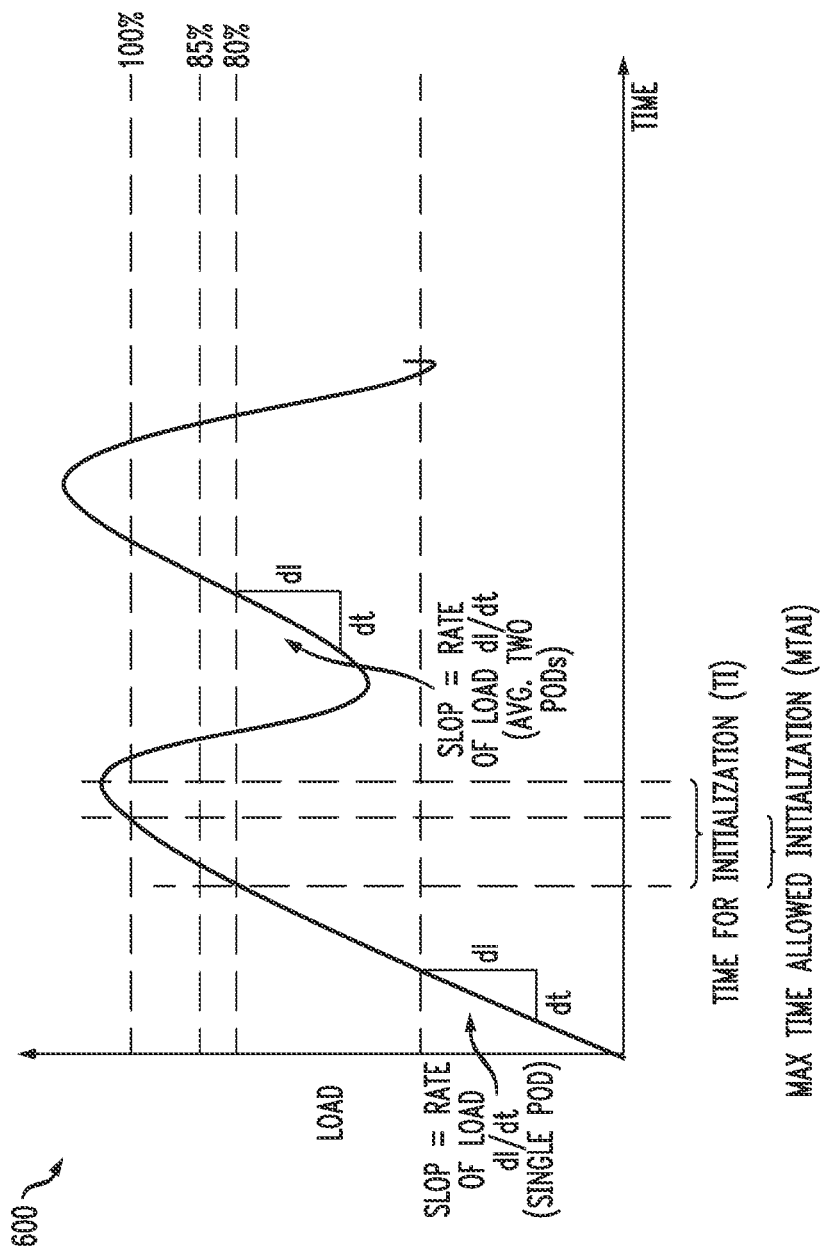

FIGS. 5 and 6 further illustrate the above issues in the context of load and with respect to a time for initialization (TI) and a maximum (max) time allowed for initialization (MTAI) of a pod. Graph 500 in FIG. 5 shows a microservice scenario when the load increases in a microservice, and the framework auto-scales more instances of the microservice according to a pre-defined static setting of a targeted resource (e.g., 80% of CPU). If the load exceeds 80% CPU, then a new instance spins off. Note that the terms auto-scaling parameter, targeted resource setting, cut off percentage parameter, and the like, are used interchangeably herein with the targetCPUUtilization parameter being only one example.

All is fine as TI is less than or equal to MTAI. However, when TI is greater than MTAI, as depicted in graph 600 of FIG. 6, the framework runs into the above issues. Here the rate of increasing load (dl/dt) is higher than the first scenario (FIG. 5), and the time for initialization is more. Hence, the microservice will hit 100% resource utilization before the new pod (instance) initializes and thus fail to serve. Time taken for the new instances, as described above, depends on the size of the microservice image and the current resources. Due to each microservice's behavior, the number of requests are different for different microservices, and the time taken for reaching 80% to 100% is different for different microservices. Some microservices will reach the maximum time allowed faster and some slower (i.e., variation in dl/dt). Also, for the same microservice with more than one instance (more pods), the dl/dt will be different. Accordingly, the static rule for the pre-defined setting for auto-scaling may result in reaching 100% usage before a new microservice instance spins off, resulting in an out of memory error. One remedy is to set the rule to a low value (e.g., 40%). However, in this case, if at 40% of CPU time and the new instance spins off, then this may result in underutilization of instances and inefficient resource consumption.

Accordingly, the problem can be defined as follows: in the current microservices auto-scaling approach, the scale out rule is pre-defined and statically set based on a guestimate. However, due to variability in the microservice and environment (different behavior of microservices, variable load, variation in the resources over a time period, and size of the microservice image), the time for initializing a new instance may be more than the time to reach 100% of resource utilization by a particular microservice. This will lead to errors for microservice clients which is not acceptable.

Illustrative embodiments address this and other issues by providing a technical solution that, inter alia, predicts optimal threshold utilization values (e.g., CPU, memory and custom) for a new microservice that deploys in production and dynamically assigns the optimal values to control when a new pod would start spinning for load distribution. For example, illustrative embodiments predict pod initializing time for a given environment and set the optimal targetCPUUtilization and targetMemoryUtilization parameters based on prediction results. These parameter values are dynamic and can be re-adjusted as the environment conditions change by re-running the prediction in production in a given interval.

In one or more illustrative embodiments, the technical solution comprises two parts:

(i) Execute a prediction model in the production to predict the time taken for initializing a new pod in a given cluster and varied time for a newly deployed microservice; and (ii) Record the rate of change of load (dL/dt) in a production-like environment against a maximum expected parallel request (load) in different times (load varies with time span) for setting the optimal parameter values based on the prediction model during the specific interval of the day.

Figure 7:
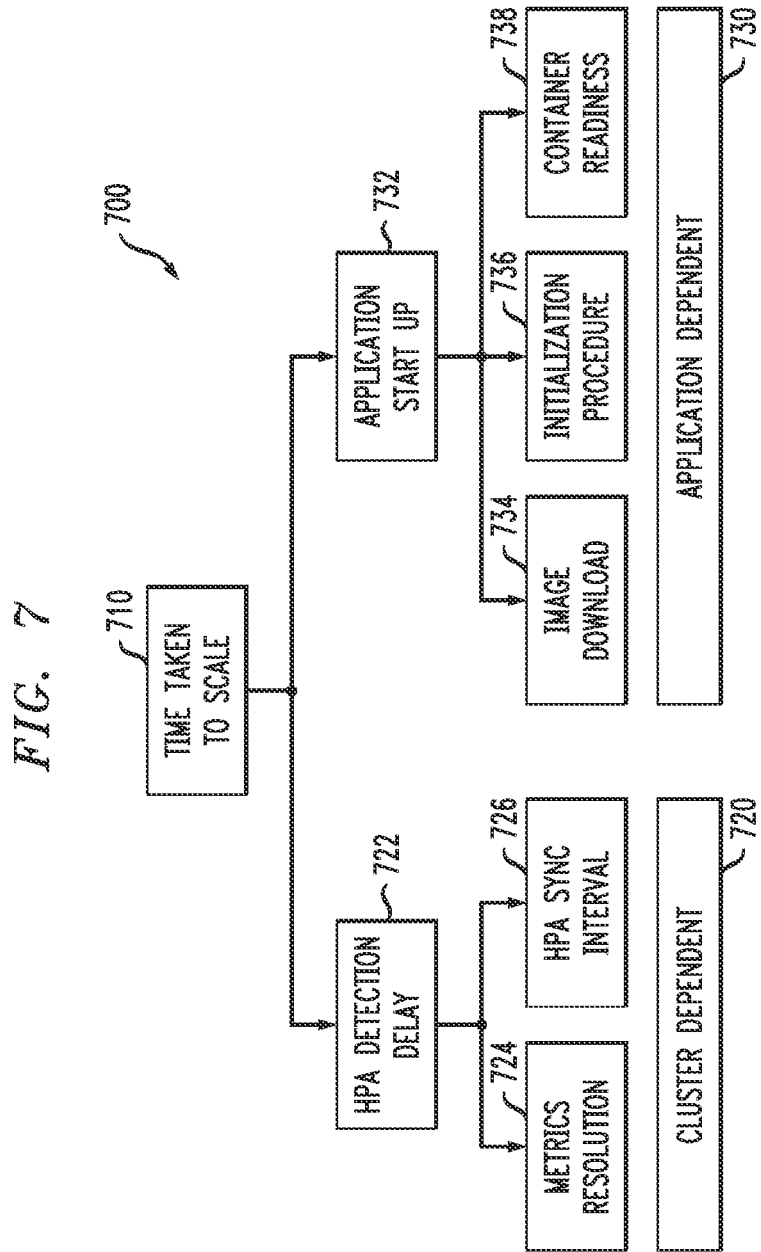
FIG. 7 illustrates a set of factors contributing to a time delay associated with initializing a pod used by a prediction model according to an illustrative embodiment.

In terms of the prediction model to predict the initializing lag for a new pod in production for a new microservice, it is realized herein that there are multiple factors that affect this initializing lag. FIG. 7 illustrates a visualization 700 of main factors. As shown, the time taken to scale 710 comprises cluster dependent factors 720 and application dependent factors 730.

For cluster dependent factors 720, a main factor comprises HPA detection delay 722 which is the amount of time (time delay) that an HPA module takes to detect that there is a need for a new pod. HPA detection delay 722 is affected by two sub-factors, as shown, metrics resolution 724 and an HPA sync interval 726. While for application dependent factors 730, a main factor comprises application start-up delay 732 which is the amount of time (time delay) that an application takes to spin a new pod. This application start-up delay 732 is affected by three sub-factors, as shown, image download 734, initialization procedure 736, and container readiness 738.

Figure 8:
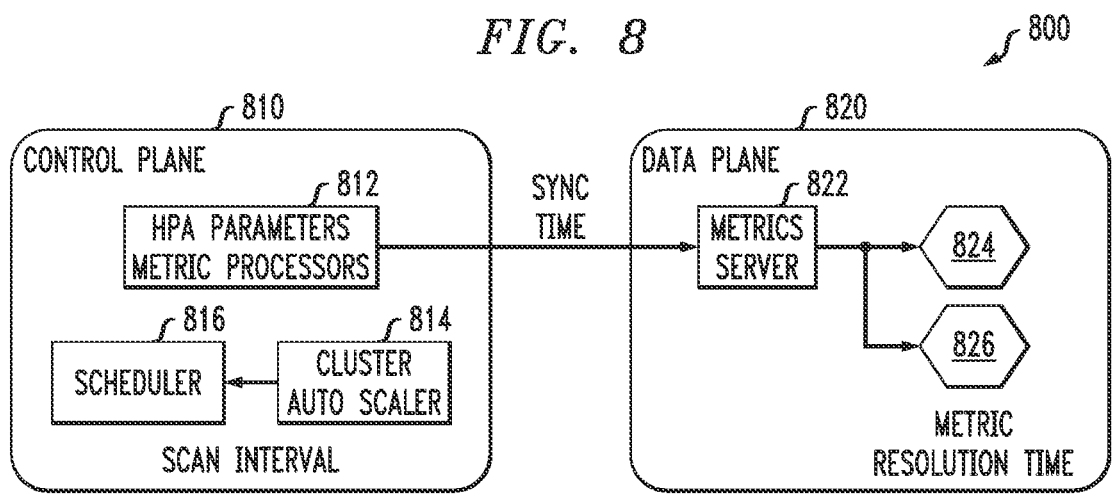
FIG. 8 illustrates a control plane/data plane environment where pod-based horizontal auto-scaling is implemented according to an illustrative embodiment.

FIG. 8 further illustrates HPA detection delay in a control plane/data plane diagram 800. More particularly, as shown, HPA is implemented in a control plane 810 comprising HPA parameters metric processors 812, a cluster auto scaler 814, and a scheduler 816, and in a data plane 820 comprising a metrics server 822 and microservices 824 and 826.

Figure 9:
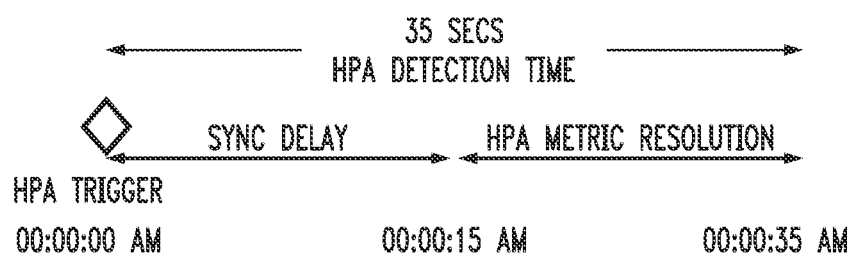
FIG. 9 illustrates a maximum horizontal auto-scaling detection time computation utilized by a prediction model according to an illustrative embodiment.
Figure 10:
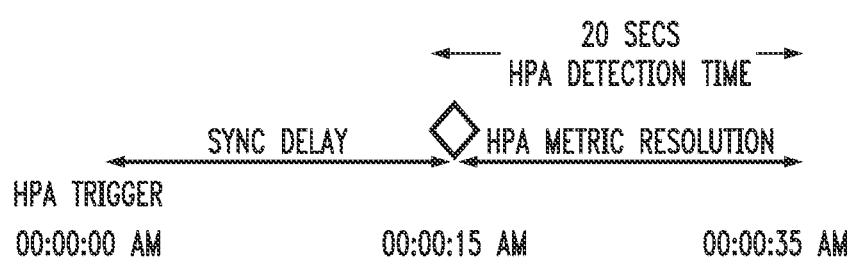
FIG. 10 illustrates a minimum horizontal auto-scaling detection time computation utilized by a prediction model according to an illustrative embodiment.

More particularly, HPA does not receive events when there is a spike in the metrics. Rather, HPA parameters metric processors 812 polls for metrics from metrics server 822, e.g., every few seconds. This is the sync time. Sync time for a cluster setup is constant for a given environment. Metrics server 822, which HPA polls for metrics by default, itself polls for aggregate metrics over a period of time, e.g., once every few seconds. This is also constant for a given environment. Thus, a maximum time delay for HPA detection (HPA detection delay 722) includes sync time+metric resolution time per environment, while a minimum time delay for HPA detection includes metric resolution time (when the trigger for a new pod occurs within the final second of the sync delay). FIG. 9 shows an example computation 900 for a maximum time delay for HPA detection, while FIG. 10 shows an example computation 1000 for a minimum time delay for HPA detection. The maximum HPA detection delay can be selected for critical microservice applications (e.g., where an out of memory error cannot be tolerated) and selects an average time delay (average of the maximum and minimum HPA detection delays) for a normal (non-critical) microservice applications.

For the application startup delay 732, recall that there are three contributing sub-factors: image download 734, initialization procedure 736, and container readiness 738. Image download 734 is the main time delay and depends on the size of the deployment image which depends on the number of lines of code. The time delay associated with initialization procedure 736 depends on any specific code developer written in the initialization of the microservice. In most cases, there is no specific custom initialization. The time delay associated with container readiness 738 comes into play, once the initialization done, since the pod needs to be ready to service the request. This is constant for a given environment. Thus, the main variability is the time delay associated with image download 734 and initialization procedure 736.

To predict the image download 734 time in different time ranges, it is realized herein that, in different times and different days, the load in the server will be different, and this impacts the speed of download of a deployment image. As shown in table 1100 of FIG. 11, illustrative embodiments collect, for the targeted execution environment (e.g., production), different loading times against the image sizes (or the number of lines in the code) in different historical time spans of one hour with the available CPU and memory resource capacity for that cluster. Data over multiple days can be collected and stored in the same way.

Figure 12:
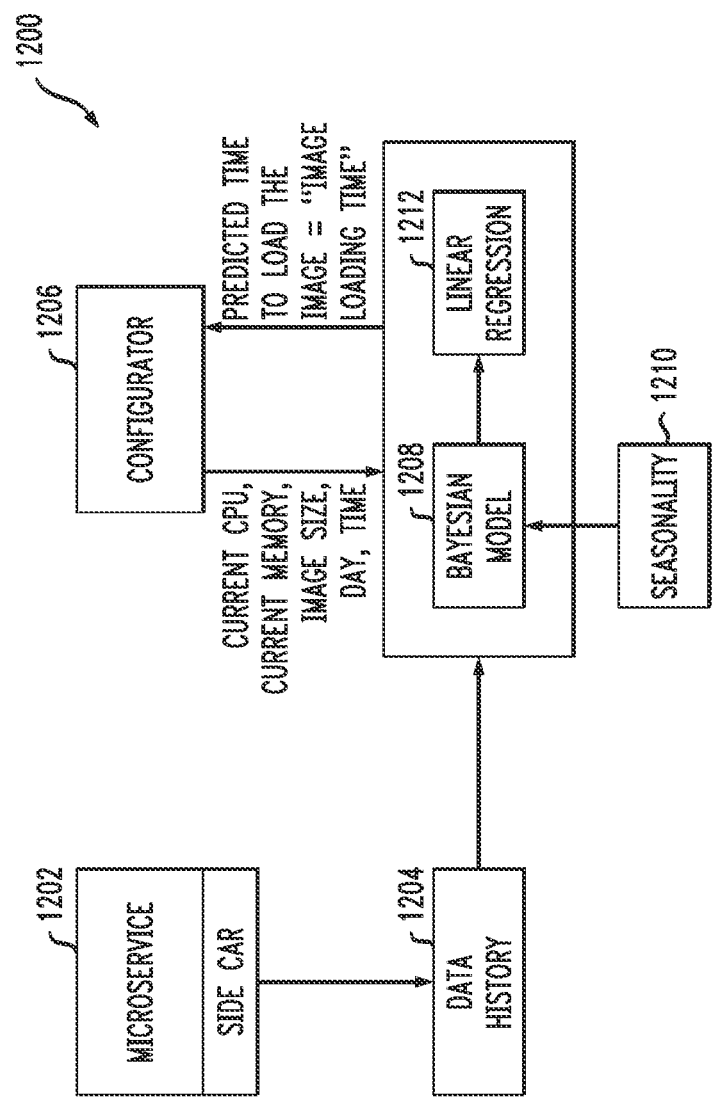
FIG. 12 illustrates an image download time computation utilized by a prediction model according to an illustrative embodiment.

FIG. 12 illustrates a system 1200 for predicting a deployment image time delay. As shown, the above-mentioned data is collected for a microservice 1202 and stored as data history 1204. A configurator 1206 uses a Bayesian network model 1208 with seasonality variation 1210 and a linear regression algorithm 1212 to predict the image loading time for microservice 1202 based on collected data in data history 1204 including: current day; current time; current memory usage; current CPU usage; and image size. As is evident, sometimes microservice 1202 will not spin any additional pod as the load can be handled with the default number of pods. In this case, configurator 1206 indicates the predicted time delay as zero for normal service and as the minimum time delay for the critical service.

Turning now to the prediction of the initialization procedure 736 time and container readiness 738 time, there are two scenarios to consider: default initialization; and custom initialization where a developer has written some customer-specific logic while initializing containers.

For default initialization, illustrative embodiments use the production profiling of Kubernetes against different image sizes, and computes a time prediction for the new microservice. For custom initialization, since it is not always known what the developer wrote during initialization, illustrative embodiments use the production-like environment to predict the time value. For example, using kubectl get po <pod_name>-o yaml, the new image is run in a production-like environment, and the various conditions of the pod containers can be captured. From that, the pod initializing time can be extracted, and the root yaml configuration file can be updated with the initializing time.

Accordingly, taking into account the above-described time delays and methodologies for computing them, a prediction model to predict the initializing lag for a new pod in production for a new microservice performs the following computations:

Max Lag Time=Sync Time Setting (Production)+
Metric Resolution Setting (Production)+Predicted Image Downloading time+Calculated Init Container Initialization time (Non-Prod or production-like); and     (i)

Min Lag Time=Metric Resolution Setting (Production)+Predicted Image Downloading time+Predicted Init Container Initialization time     (ii)

For critical microservices, where HPA cannot afford to fail, the prediction model outputs Max Lag Time, and for other microservices, the prediction model outputs the mean or average time (Max Lag Time+Min Lag Time)/2. Note that the Max Lag Time may be considered a maximum composite time delay value and the Min Lag Time may be considered a minimum composite time delay value.

Figure 13:
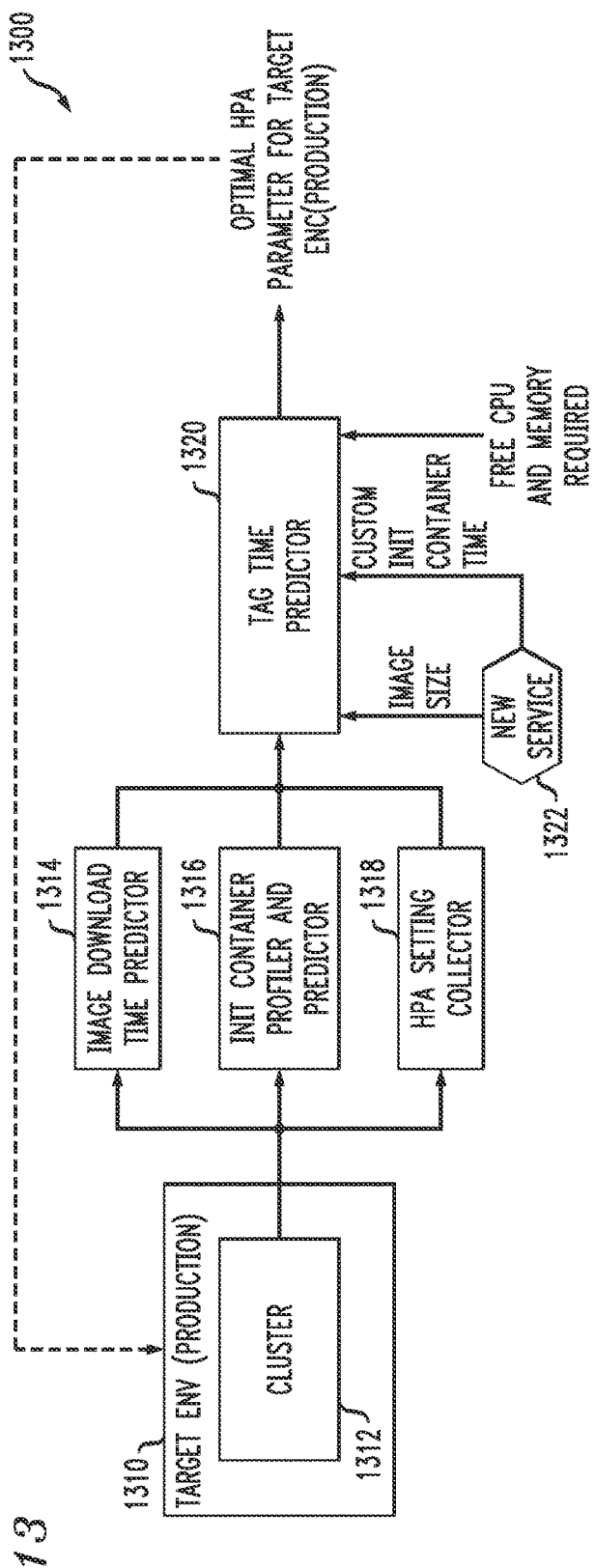
FIG. 13 illustrates a container workload management system with threshold utilization parameter prediction functionalities according to an illustrative embodiment.

FIG. 13 illustrates a container workload management system 1300 for predicting the optimal threshold utilization values (e.g., CPU, memory and custom) for a new microservice that deploys in production and dynamically assigns the optimal values for when a new pod would start spinning for load distribution. Recall that this comprises two parts: (i) execute the prediction model to predict the time taken for initializing the new pod in a given cluster and varied time for the newly deployed microservice; and (ii) record the rate of change of Load (dL/dt) in a production-like environment against a maximum expected parallel request (load) in different times (load varies with time span) for setting the optimal parameter value(s) based on the prediction model during the specific interval of the day.

As shown, a target environment 1310 (production) comprises a pod cluster 1312 which is operatively coupled to inputs of an image download time predictor 1314, an initialization (init) container profiler and predictor 1316, and an HPA setting collector 1318. A tag time predictor 1320 is operatively coupled to outputs of image download time predictor 1314, initialization container profiler and predictor 1316, and HPA setting collector 1318. Tag time predictor 1320 also receives the amount of free CPU and memory required (e.g., from a system administrator or automated system), and an image size and custom initialization container time from a new microservice 1322. The tag time predictor 1320 outputs the optimal HPA parameter(s) for the target environment 1310.

Accordingly, the CPU and memory to keep free at all time is decided such that the new parameters in the yaml file are set as:
(i) TargetMaxCPUUtilization=90%
(ii) TargetMaxMemoryUtilization=90%
(iii) AutoTargetRecalculationEnabled=true
(iv) EnableInitProfiling=true
(v) CriticalApp=true When "EnableInitProfiling" is set to true, container workload management system 1300 calculates the initialization time in each non-production environment and sets the container initialization parameter (Container_Initi_Value) to the value.

When the image is deployed, container workload management system 1300:
(i) Runs the prediction model passing the image size, day, time, current CPU and memory usage to get the predicted image downloading time;
(ii) Gets the sync time setting (production)+metric resolution setting (production) of the existing cluster 1312; and
(iii) Gets Container_Initi_Value from the previous non-production run.

If parameter CriticalApp=true;

Total time for new pod (microservice 1322) in HPA=Sync Time Setting+Metric Resolution Setting+Predicted Image Downloading time+ Calculated Init Container Initialization time.

Thus, container workload management system 1300 sets the actual CPU and memory parameter to:

targetCPUUtilizationPercentage=90−Total time for new pod in HPA targetMemoryUtilizationPercentage=90−Total time for new pod in HPA For example, the image download time prediction model is run at one hour intervals, and if there is change in the predicted downloading time, the targetResourceUtilizationPercentage is updated.

Advantageously, illustrative embodiments provide a system and method for predicting the HPA pod detection and initialization time and enables dynamic target resource consumption HPA parameters throughout a varying load scenario based on the HPA pod detection and initialization time prediction performed multiple times a day. Further, illustrative embodiments enable the ability to set the free resource target rather than the pod initializing trigger point.

Figure 14:
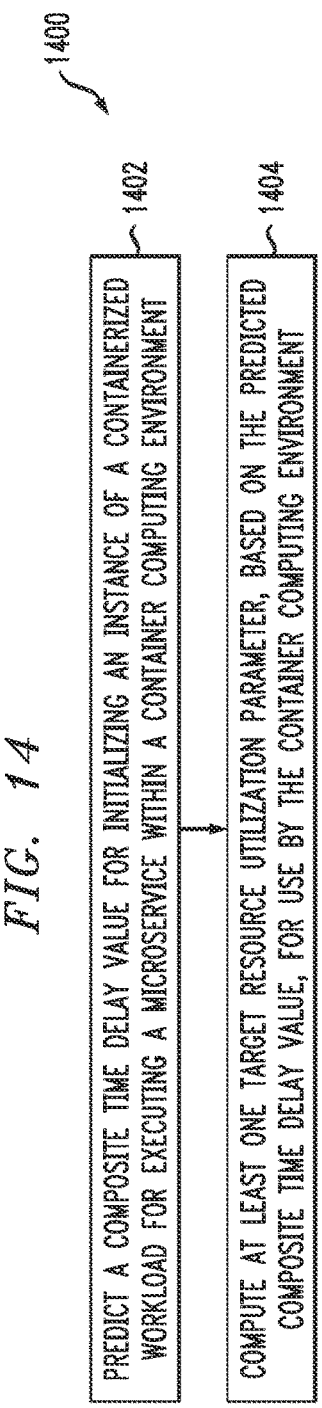
FIG. 14 illustrates a methodology for dynamic management of threshold utilization parameters in a containerized workload-based environment according to an illustrative embodiment.

FIG. 14 illustrates a methodology 1400 for dynamic management of at least one threshold utilization parameter according to an illustrative embodiment. As shown, step 1402 predicts a composite time delay value for initializing an instance of a containerized workload for executing a microservice within a container computing environment. Step 1404 computes at least one target resource utilization parameter, based on the predicted composite time delay value, for use by the container computing environment.

In further illustrative embodiments, the method re-predicts the composite time delay value at a subsequent time interval, and adjusts the at least one target resource utilization parameter based on the re-predicted composite time delay value.

In other illustrative embodiments, predicting the composite time delay value may further comprise computing a time delay factor associated with detection of a condition for initiating a new containerized workload instance, wherein a maximum value for the time delay factor associated with detection of a condition for initiating a new containerized workload instance comprises a sum of a sync time component and a metric resolution component, and a minimum value for the time delay factor associated with detection of a condition for initiating a new containerized workload instance comprises the metric resolution component.

In still other illustrative embodiments, predicting the composite time delay value may further comprise computing a time delay factor associated with starting an application program to be executed in a new containerized workload instance. The time delay factor associated with starting an application program to be executed in a new containerized workload instance may comprise an image download time component and a container initialization time component, wherein the image download time component is computed by applying one or more machine learning-based algorithms to image size data and resource utilization data in multiple time intervals, and wherein the container initialization time component is computed based on a default value or a custom value.

Additional illustrative embodiments may predict: a maximum value for the composite time delay value by summing the sync time component, the metric resolution component, the image download time component, and the container initialization time component; and a minimum value for the composite time delay value further comprises summing the metric resolution component, the image download time component, and the container initialization time component. When the microservice is identified as having a first level of criticality (e.g., critical), the maximum value of the composite time delay value is used to compute the at least one target resource utilization parameter, and when the microservice is identified as having a second level of criticality (e.g., non-critical), the mean of the maximum value and the minimum value of the composite time delay value is used to compute the at least one target resource utilization parameter.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for containerized workload auto-scaling management in container environments will now be described in greater detail with reference to FIGS. 15 and 16. It is to be appreciated that systems and processes described in the context of FIGS. 1-14 can be performed via the platforms in FIGS. 15 and/or 16 but may also be implemented, in whole or in part, in other information processing systems in other embodiments.

Figure 15:
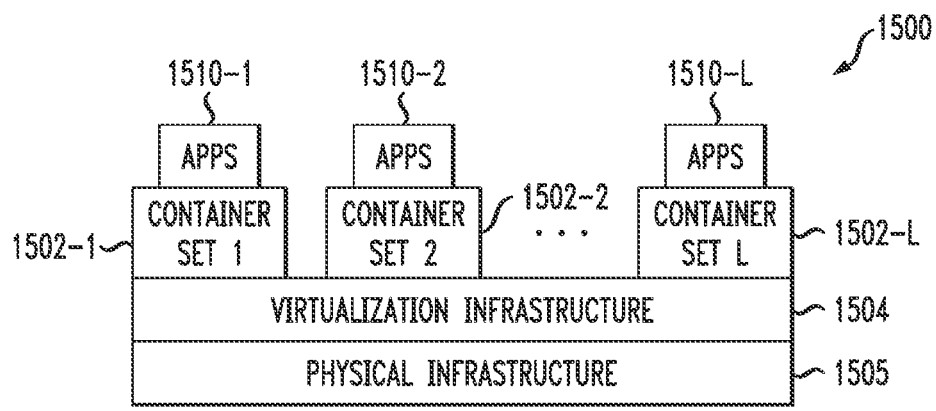
FIGS. 15 and 16 respectively illustrate examples of processing platforms that may be utilized to implement at least a portion of an information processing system with a pod-based container environment according to one or more illustrative embodiments.
Figure 16:
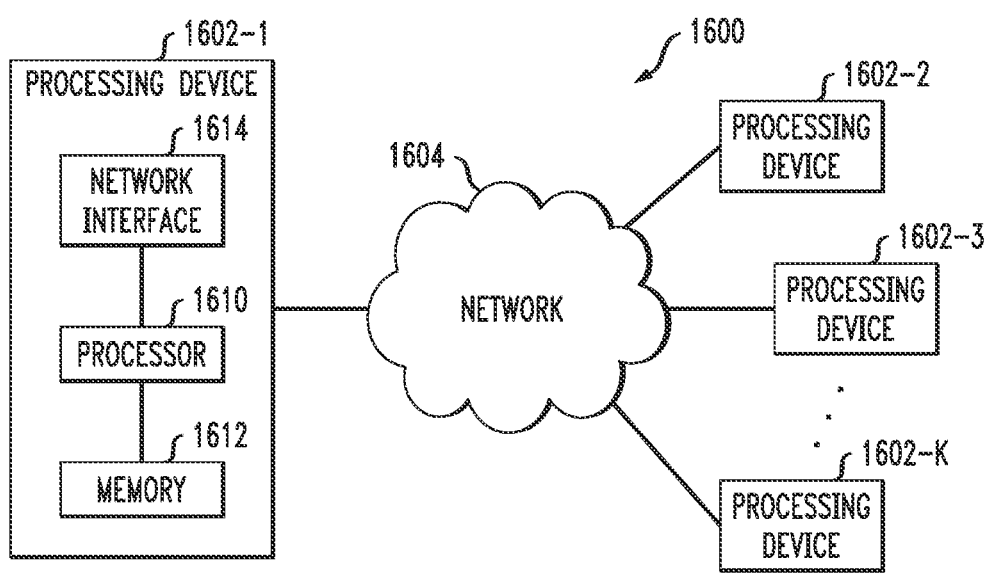

FIG. 15 shows an example processing platform comprising cloud infrastructure 1500. The cloud infrastructure 1500 comprises a combination of physical and virtual processing resources that may be utilized to implement at least a portion of the information processing systems described herein. The cloud infrastructure 1500 comprises multiple container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure.

The cloud infrastructure 1500 further comprises sets of applications 1510-1, 1510-2, . . . 1510-L running on respective ones of the container sets 1502-1, 1502-2, . . . 1502-L under the control of the virtualization infrastructure 1504. The container sets 1502 may comprise respective sets of one or more containers.

In some implementations of the FIG. 15 embodiment, the container sets 1502 comprise respective containers implemented using virtualization infrastructure 1504 that provides operating system level virtualization functionality, such as support for Kubernetes-managed containers.

As is apparent from the above, one or more of the processing modules or other components of system 100/200 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100/200 and includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA) or other type of processing circuitry, as well as portions or combinations of such circuitry elements.

The memory 1612 may comprise random access memory (RAM), read-only memory (ROM), flash memory or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and systems 100/200 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, the at least one processing platform, when executing program code, is configured to:
predict, using a prediction model, a composite time delay value for initializing an instance of a containerized workload for executing a microservice of a given microservice-based application within a container computing environment during a given time interval in a given cluster of the container computing environment based on an input of one or more cluster-dependent factors associated with the given cluster and one or more application-dependent factors associated with the given microservice-based application, wherein the microservice is indicated as having one of a first level of criticality and a second level of criticality, and wherein the composite time delay value is calculated based on whether the microservice is indicated as having one of the first level of criticality and the second level of criticality;
compute at least one dynamic target resource utilization parameter, based on the predicted composite time delay value, for use by the given cluster of the container computing environment;
iteratively re-predict, using the prediction model, the composite time delay value at another time interval to measure and record a predicted rate of change for the containerized workload for executing the microservice of the given microservice-based application based at least on the predicted composite time delay value for the given time interval and the re-predicted composite time delay value for the other time interval;
automatically adjust the at least one dynamic target resource utilization parameter based on the re-predicted composite time delay value and the predicted rate of change; and
initialize an additional instance of the containerized workload based on the automatically adjusted at least one dynamic target resource utilization parameter.

2. The apparatus of claim 1, wherein predicting the composite time delay value further comprises computing a time delay factor associated with detection of a condition for initiating a new containerized workload instance.

3. The apparatus of claim 2, wherein a maximum value for the time delay factor associated with detection of a condition for initiating a new containerized workload instance comprises a sum of a sync time component and a metric resolution component.

4. The apparatus of claim 3, wherein a minimum value for the time delay factor associated with detection of a condition for initiating a new containerized workload instance comprises the metric resolution component.

5. The apparatus of claim 4, wherein predicting the composite time delay value further comprises computing a time delay factor associated with starting an application program to be executed in a new containerized workload instance.

6. The apparatus of claim 5, wherein the time delay factor associated with starting an application program to be executed in a new containerized workload instance comprises an image download time component and a container initialization time component.

7. The apparatus of claim 6, wherein the image download time component is computed by applying one or more machine learning-based algorithms to image size data and resource utilization data in multiple time intervals.

8. The apparatus of claim 6, wherein the container initialization time component is computed based on a default value or a custom value.

9. The apparatus of claim 8, wherein predicting a maximum value for the composite time delay value further comprises summing the sync time component, the metric resolution component, the image download time component, and the container initialization time component.

10. The apparatus of claim 9, wherein predicting a minimum value for the composite time delay value further comprises summing the metric resolution component, the image download time component, and the container initialization time component.

11. The apparatus of claim 10, wherein when the microservice is identified as having the first level of criticality, the maximum value of the composite time delay value is used to compute the at least one dynamic target resource utilization parameter.

12. The apparatus of claim 10, wherein when the microservice is identified as having the second level of criticality, the mean of the maximum value and the minimum value of the composite time delay value is used to compute the at least one dynamic target resource utilization parameter.

13. A method comprising:
predicting, using a prediction model, a composite time delay value for initializing an instance of a containerized workload for executing a microservice of a given microservice-based application within a container computing environment during a given time interval in a given cluster of the container computing environment based on an input of one or more cluster-dependent factors associated with the given cluster and one or more application-dependent factors associated with the given microservice-based application, wherein the microservice is indicated as having one of a first level of criticality and a second level of criticality, and wherein the composite time delay value is calculated based on whether the microservice is indicated as having one of the first level of criticality and the second level of criticality, and wherein the composite time delay value is calculated based on whether the microservice is indicated as having one of the first level of criticality and the second level of criticality;
computing at least one dynamic target resource utilization parameter, based on the predicted composite time delay value, for use by the given cluster of the container computing environment;
iteratively re-predicting, using the prediction model, the composite time delay value at another time interval to measure and record a predicted rate of change for the containerized workload for executing the microservice of the given microservice-based application based at least on the predicted composite time delay value for the given time interval and the re-predicted composite time delay value for the other time interval;
automatically adjusting the at least one dynamic target resource utilization parameter based on the re-predicted composite time delay value and the predicted rate of change; and
initializing an additional instance of the containerized workload based on the automatically adjusted at least one dynamic target resource utilization parameter;
wherein the method is performed by at least one processing device comprising a processor coupled to a memory when executing program code.

14. The method of claim 13, wherein predicting the composite time delay value further comprises:
computing a time delay factor associated with detection of a condition for initiating a new containerized workload instance; and
computing a time delay factor associated with starting an application program to be executed in a new containerized workload instance.

15. The method of claim 14, wherein:
a maximum value for the time delay factor associated with detection of a condition for initiating a new containerized workload instance comprises a sum of a sync time component and a metric resolution component; and
a minimum value for the time delay factor associated with detection of a condition for initiating a new containerized workload instance comprises the metric resolution component.

16. The method of claim 15, wherein the time delay factor associated with starting an application program to be executed in a new containerized workload instance comprises an image download time component and a container initialization time component.

17. The method of claim 16, wherein:
predicting a maximum value for the composite time delay value further comprises summing the sync time component, the metric resolution component, the image download time component, and the container initialization time component; and
predicting a minimum value for the composite time delay value further comprises summing the metric resolution component, the image download time component, and the container initialization time component.

18. The method of claim 17, wherein:
when the microservice is identified as having the first level of criticality, the maximum value of the composite time delay value is used to compute the at least one dynamic target resource utilization parameter; and
when the microservice is identified as having the second level of criticality, the mean of the maximum value and the minimum value of the composite time delay value is used to compute the at least one dynamic target resource utilization parameter.

19. A computer program product comprising a non-transitory processor-readable storage medium having stored therein program code of one or more software programs, wherein the program code when executed by at least one processing platform causes the at least one processing platform to:
predict, using a prediction model, a composite time delay value for initializing an instance of a containerized workload for executing a microservice of a given microservice-based application within a container computing environment during a given time interval in a given cluster of the container computing environment based on an input of one or more cluster-dependent factors associated with the given cluster and one or more application-dependent factors associated with the given microservice-based application, wherein the microservice is indicated as having one of a first level of criticality and a second level of criticality, and wherein the composite time delay value is calculated based on whether the microservice is indicated as having one of the first level of criticality and the second level of criticality, and wherein the composite time delay value is calculated based on whether the microservice is indicated as having one of the first level of criticality and the second level of criticality;
compute at least one dynamic target resource utilization parameter, based on the predicted composite time delay value, for use by the given cluster of the container computing environment;
iteratively re-predict, using the prediction model, the composite time delay value at another time interval to measure and record a predicted rate of change for the containerized workload for executing the microservice of the given microservice-based application based at least on the predicted composite time delay value for the given time interval and the re-predicted composite time delay value for the other time interval;
automatically adjust the at least one dynamic target resource utilization parameter based on the re-predicted composite time delay value and the predicted rate of change; and
initialize an additional instance of the containerized workload based on the automatically adjusted at least one dynamic target resource utilization parameter.

20. The computer program product of claim 19, wherein predicting the composite time delay value further comprises:
computing a time delay factor associated with detection of a condition for initiating a new containerized workload instance; and
computing a time delay factor associated with starting an application program to be executed in a new containerized workload instance.

* * * * *